June 7, 1932. C. C. STEVENS 1,862,042
CHUCK LOADING MECHANISM
Filed March 29, 1929 3 Sheets-Sheet 1

INVENTOR
CLARENCE C. STEVENS,
BY
HIS ATTORNEY

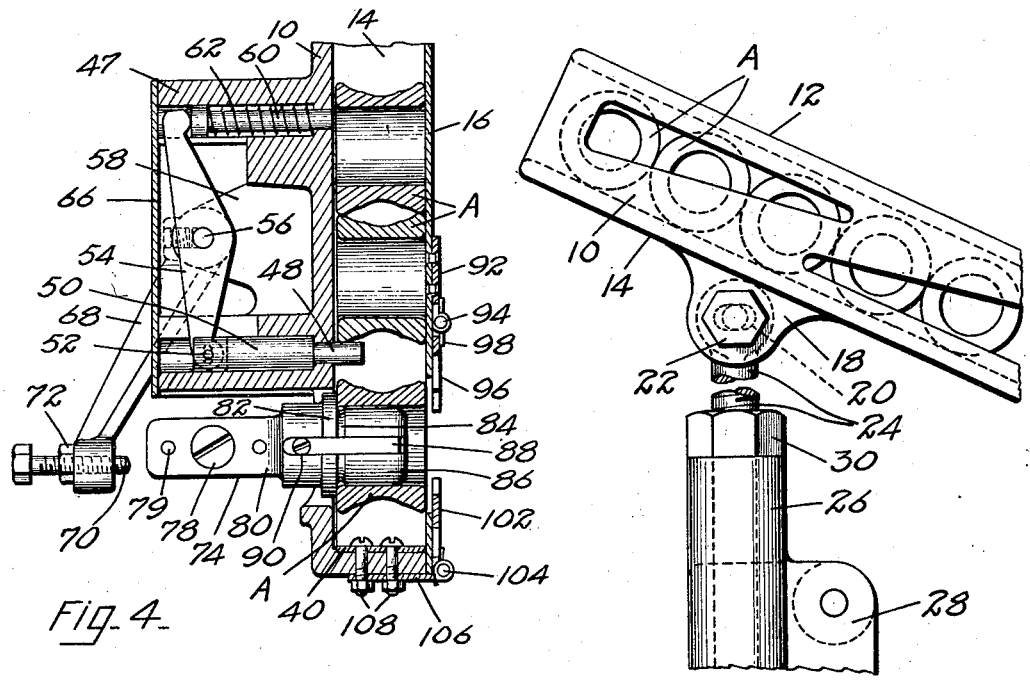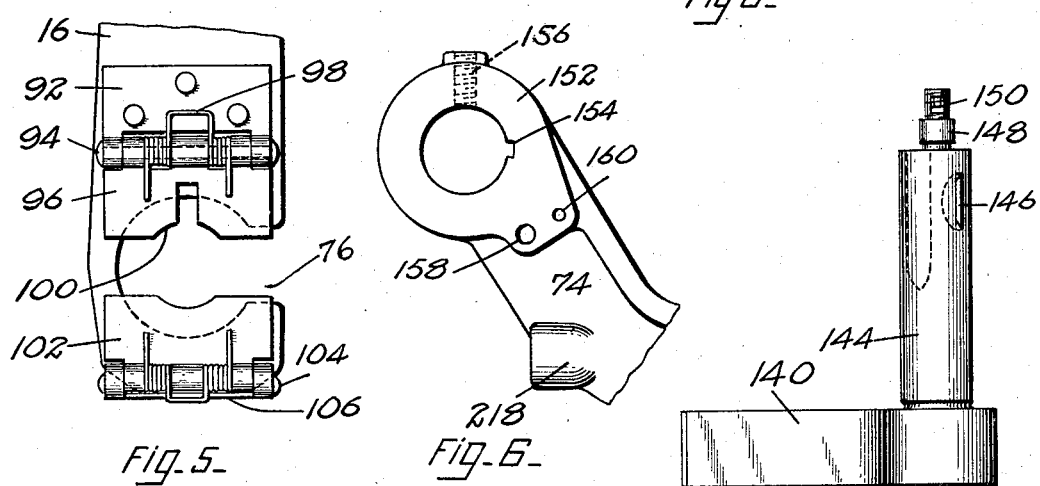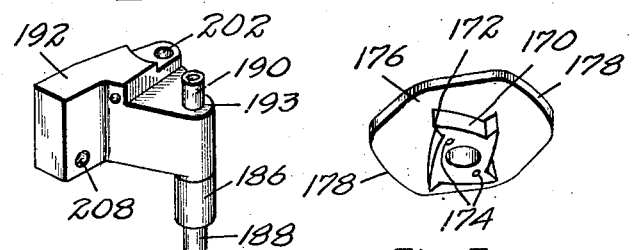

June 7, 1932.  C. C. STEVENS  1,862,042
CHUCK LOADING MECHANISM
Filed March 29, 1929  3 Sheets-Sheet 3
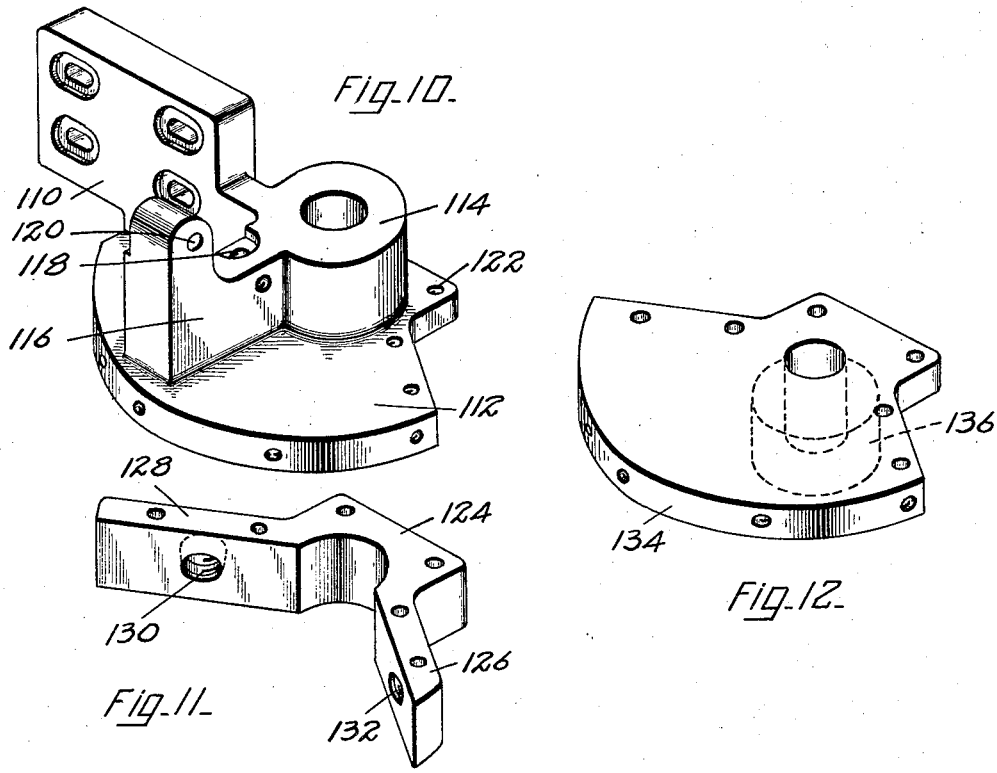
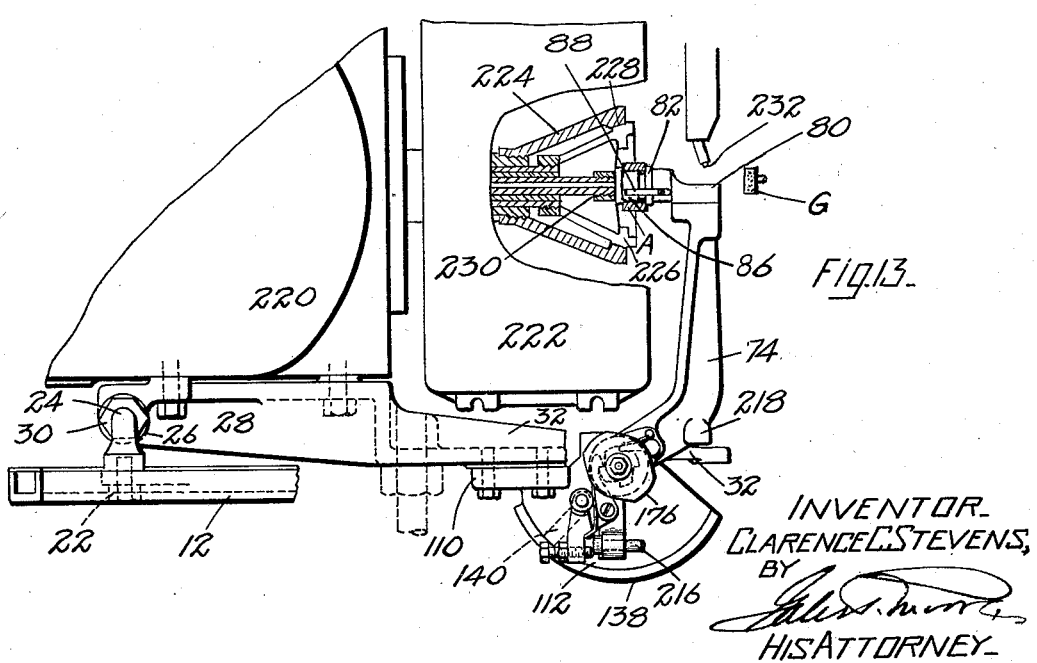
INVENTOR.
CLARENCE C. STEVENS,
BY
HIS ATTORNEY.

Patented June 7, 1932

1,862,042

UNITED STATES PATENT OFFICE

CLARENCE C. STEVENS, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

CHUCK LOADING MECHANISM

Application filed March 29, 1929. Serial No. 351,037.

This invention relates to chuck loading mechanism and comprises all the features of novelty herein disclosed. An object of the invention is to provide improved mechanism for automatically transferring articles from a source of supply to a chuck and removing the articles from the chuck. Another object is to provide a fluid operated chuck loading mechanism of simple and compact form for application to machine tools, such as grinding machines. To these ends and to improve generally and in detail upon mechanism of this character, the invention further consists in the various matters hereinafter disclosed and claimed.

In its broader aspects, the invention is not necessarily limited to the specific embodiment selected for illustration in the accompanying drawings in which Fig. 1 is a front elevation with some parts broken away or in section.

Fig. 3 is a front view of a portion of the chute and its support.

Fig. 4 is a sectional view of the escapement mechanism and associated parts.

Fig. 5 is a rear view of the strippers.

Fig. 6 is a plan view of a portion of the loading arm.

Fig. 7 is a side view of a shaft and its operating vane.

Fig. 8 is a perspective view of a ratchet wheel and cam.

Fig. 9 is a perspective view of a stop carrying lever.

Figs. 10 to 12, inclusive, are perspective views of cylinder details.

Fig. 13 is a plan view of the mechanism in its operative relation to the work head of an internal grinding machine.

First stating the functions generally, articles such as rings or sleeves to be internally ground are fed into an inclined chute or magazine provided with escapement mechanism which places the pieces successively in a position to be transferred from the end of the chute to a chuck or work holder. The transfer is effected by a swinging arm operated by fluid pressure in timed relation to the opening and closing of the chuck clamping jaws. The swinging arm actuates the escapement mechanism, preferably on alternate oscillations, the intermediate oscillating movement then taking the finished piece out of the chuck and directing it to a receptacle.

Figure 1:
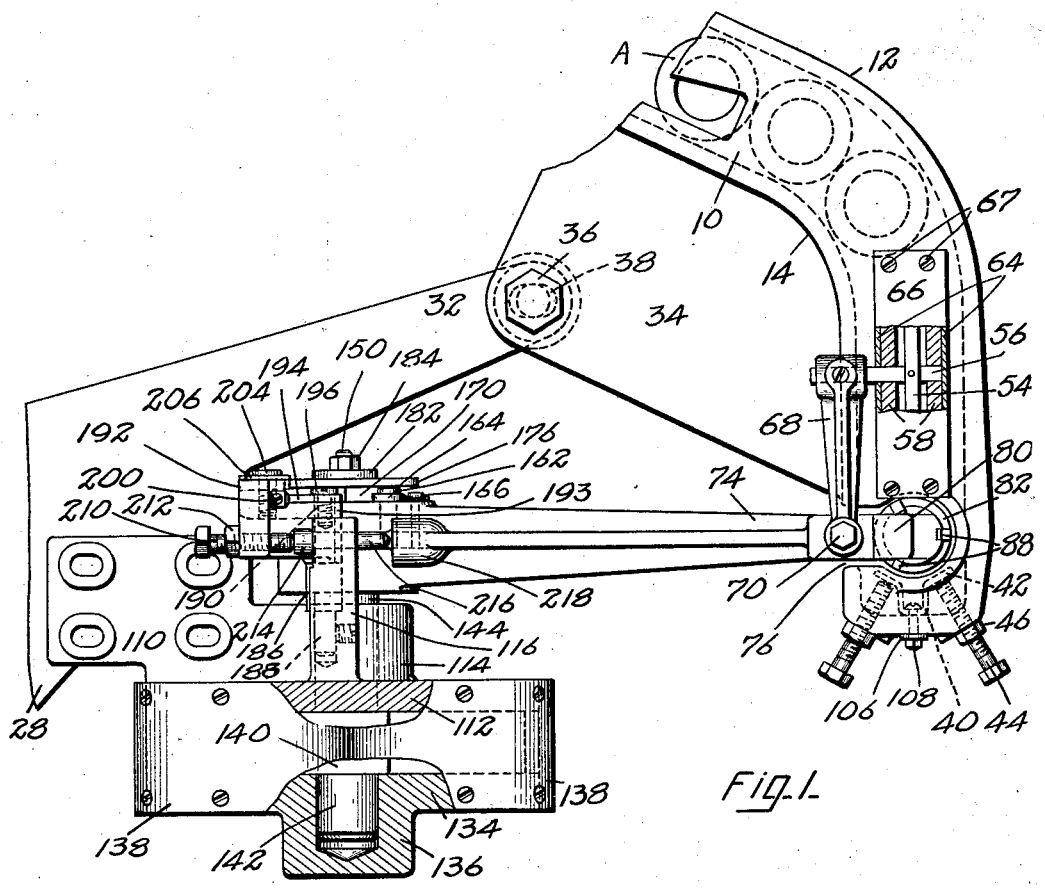

The numeral 10 indicates an inclined chute having a top wall 12, bottom wall 14, and rear closure plate 16. The chute has a lug 18 (Fig. 3) with a slot 20 by means of which a clamping bolt 22 adjustably secures the chute to a standard 24. The standard is threaded and enters a smooth opening in a post 26 on a bracket 28. A nut 30 threaded on the standard and resting on the post serves to vary the height of the chute and its inclination so that the articles A will roll or otherwise move down the chute by gravity. The bracket has an arm 32 (Fig. 1) to which a web 34 at the bend of the chute is adjustably secured by a bolt 36 passing through a slot 38. At the lower end of the chute is a locating plate 40 of U-shape with diverging arms 42 which support the article which is to be transferred to the chuck. The arms are engaged by adjusting screw bolts 44 threaded in the chute wall and locked by nuts 46.

The escapement mechanism is contained in a housing 47 (Figs. 1 and 4) near the lower end of the chute at the front. All articles in the chute, except the one about to be transferred, are retained temporarily by a pin 48 on a forked and slotted plunger 50 which slides in the housing. A pin 52 extends through the slots of the forked plunger and pivotally connects the plunger to the lower end of a rocking lever 54 which is secured by a set screw to rock shaft 56 which is journalled in cheeks 58 of the housing. The upper end of the rocking lever engages the head of a plunger or pin 60 which is pressed in one direction by a coiled spring 62. A cover comprising side plates 64 and a connecting front plate 66 is secured by screws 67 to the housing. A trip arm 68 is secured to the rock shaft 56 by a set screw and carries an abutment screw 70 which is held in adjusted position by a nut 72. The abutment screw lies in the path of an oscillating, loading or transfer arm 74 which operates through a slot 76 in the chute. The arm has an amplitude of oscillation of about 90° to get it out of the way of the chuck and grinding wheel but when it removes an article A from the chuck on the alternate oscillations, it is retracted through a little larger angle to operate the escapement mechanism by engagement with the pin 70 on arm 68. Before the lower pin 48 is withdrawn from the chute to release an article, the upper pin 60 enters the bore of the article next above. Then, as the loading arm is advanced to carry the released article to the chuck, the spring 62 retracts the upper pin and advances the lower one to hold the remaining articles.

An article carrier having a work centering part is attached to the end of the arm 74 by a screw 78 and dowel pins 79. It comprises a flat attaching portion 80 and an enlarged portion having a flange 82, a groove 84 and a nose piece or plug 86 which freely enters the bore of an article properly located on the spring arms 42. The enlarged portion has a series of longitudinal slots, each receiving a leaf spring 88 which is fastened by a screw 90. The ends of the springs enter the bore of an article with the nose piece or plug 86 but will exert a little outward pressure sufficient to enable the carrier to pick up an article out of the chuck if the chuck clamping jaws are relased. When transferring an article from the chute to the chuck, the carrier flange 82 engages the article and forces it past a pair of gates or strippers in the form of spring hinges, these members acting on a retracting stroke of the carrier to strip a finished article therefrom. On the rear of the chute cover plate 16 is attached a plate 92 having a pintle 94 for a stripper plate 96, a coil spring 98 acting to hold the plate in stripping position. The plate 96 has an arcuate edge 100 large enough to let the flange 82 pass but small enough to engage the end of a finished article and strip it from the nosepiece or plug 86. A similar lower spring stripper plate 102 has a pintle 104 on an attaching plate 106 secured under the end of the chute by screw bolts 108 which also fasten the locating plate 40 above mentioned. The motor and other mechanism for oscillating the loading arm through angles which are alternately different in amplitude will next be described.

Referring to Figs. 1, 2, 10, 11 and 12, a casting having a vertical attaching web 110 is bolted to the bracket arm 32 and has a sectoral flange 112 which forms the head or top of an operating cylinder of sectoral form. The casting has a bored boss 114, a vertical angular web 116 with a vertical hole 118 and a horizontal opening 120. Bolt holes 122 provide means for securing the head 112 to a rear cylinder member 124 having side walls 126 and 128 which diverge at an angle greater than 90°. The side walls having tapped openings 130 and 132 to receive fluid supply and exhaust pipes (not shown) which furnish motive fluid. The other head or bottom of the cylinder is formed by a sectoral plate 134 having a hollow boss 136 in line with the bored boss 114. An arcuate plate 138 bolted to the arcuate edges of the top and bottom plates 112 and 134 closes the cylinder opposite the rear cylinder member 124. The movable member or piston comprises a flat vane or blade 140, (Fig. 7) a stud 142 which is journalled in the boss 136, and a shaft 144 which is journalled in the boss 114 and projects upwardly through the latter. The shaft has a keyway 146 and a reduced cylindrical stud 148 with a threaded projection 150. The hub 152 (Fig. 6) of the oscillating loading arm 74 has a keyway 154 and an opening 156 for a set screw by which the arm is secured to the shaft. The arm also has openings 158 and 160, the former receiving a pivot stud 162 (Fig. 2) for a pawl 164 and the other receiving a stud 166 for a spring 168 which enters a groove in the pawl. The spring presses the pawl into engagement with a small ratchet wheel 170 (Fig. 8) which turns on the stud 148, the wheel having teeth 172 and openings 174 which register with openings in a cam 176. The openings provide for rivets which secure the cam to the ratchet wheel.

The cam 176 has arcuate portions and two opposite high spots 178 which alternately provide rigid stops as will appear. A washer 182 is clamped against the shoulder afforded by the stud 148 by a nut 184 threaded on the projection 150, the ratchet wheel and cam being free to turn in unison. A bar 186 has a stud portion 188 clamped by a set screw in the hole 118 of the angular vertical web 116 and a vertical post 190 which is tapped at the end. A thick lever 192 having a thinner hub 193 is pivoted on the post and supports a latch dog 194 also pivoted on the post and retained by a screw 196. The latch dog engages the ratchet wheel and locks it in advanced position, being pressed to latching position by a spring 198 secured by a screw 200 to a wall of the lever. The lever has a vertical hole 202 for a stud 204 on which a cam roll 206 is journalled. The lever 192 also has a horizontal tapped hole 208 for an abutment screw 210 having a nut 212 to lock it in adjusted position. The screw abuts against a head 214 on a pin 216 which is slidable in the opening 120 at the top of the web 116. The end of the pin 216 is in abutting relation to a lug 218 on the loading arm 74 but may or may not limit the oscillation of the arm depending on the position of the cam.

Referring to Fig. 13, the bracket 28 which supports all of the above described mechanism is bolted to a housing 220 in which the work spindle is journalled. The chuck is housed in a supplemental hood 222 and has any suitable fluid operated clamping jaws opening and closing in timed relation to the actuating piston or vane of the oscillating arm. The illustrated chuck comprises a rigid cone or outer section 224 and an inner section 226 which is slotted at a plurality of points to form yielding jaws. The inner and outer chuck sections having cooperating bevelled faces at 228 so that axial movement of the inner section will cause its expansion or contraction with respect to the article A. A gauge plug 230 is slidably mounted in the chuck to engage the article and a diamond 232 is mounted adjacent to the chuck to dress the reciprocating grinding wheel G. The swinging movement of the loading arm around its axis at the front of the machine enables it to clear the diamond and the sectoral shape of the fluid motor renders it compact so not to unduly obstruct the front of the machine.

Figure 2:
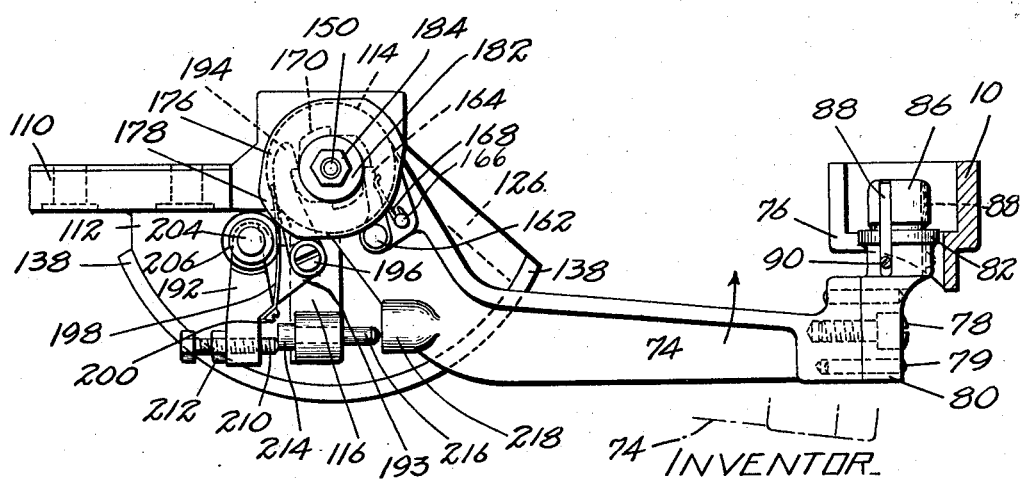
Fig. 2 is a plan view partly in section.

In Fig. 2, the mechanism occupies the position it assumes after it has returned from transferring an article from the chute to the chuck for grinding. One of the high spots on the cam 176 has swung the lever 192 around its stud 196 to bring the abutment screw 210 against the head of pin 216 and has slid the pin into the path of the lug 218 to form a rigid stop. Consequently, the loading arm 74 cannot be swung further back to the broken line position which the motor urges it to do and the escapement mechanism cannot be actuated. When the article is ground, the loading arm and empty carrier advance to pick up the article as indicated in Fig. 13. The ratchet wheel and cam are turned by the pawl to bring a low spot on the cam opposite the roller 204. Then, when the loading arm swings back with the finished article, the article is stripped off the carrier and the arm is free to have an angular retracting movement of greater amplitude, carrying it through the chute, thereby actuating the escapement mechanism and putting a new piece in loading position in the chute. The loading arm then immediately advances to transfer the new piece to the chuck and simultaneously turns the cam to bring the next high spot against the roller and so limiting the return of the arm again. The cycle is thus repeated. The stripping oscillation of the arm is not essential to the invention in its broader aspects because the grinding machine may have an independently operable ejector and so the loading arm would then desirably operate the escapement mechanism on every oscillation.

I claim:

1. In a machine having a work head with a chuck for clamping a work-piece, a chute for receiving a series of work-pieces and feeding them by gravity, a loading arm having a work carrier entering the chute, escapement mechanism actuated by abnormal movement of the loading arm for delivering work-pieces successively into the path of the work carrier, a cylinder and vane for moving the loading arm, and means for limiting the movement of the arm by the vane on alternate actuations of the arm; substantially as described.

2. In a machine having a work head with a chuck for clamping a work-piece, a chute for receiving a series of work-pieces and feeding them by gravity, a loading arm having a work carrier entering the chute, escapement mechanism actuated by abnormal movement of the loading arm for delivering work-pieces successively into the path of the work carrier, a cylinder and vane for moving the loading arm, and mechanism for limiting the movement of the arm by the vane on alternate actuations of the arm, said mechanism comprising a rotary cam, and a pawl and ratchet for turning the cam; substantially as described.

3. In a machine having a work head with a chuck for clamping a work-piece, a chute for receiving a series of work-pieces and feeding them by gravity, a loading arm having a work carrier entering the chute, escapement mechanism actuated by abnormal movement of the loading arm for delivering work-pieces successively into the path of the work carrier, a cylinder and vane for moving the loading arm, and mechanism for limiting the movement of the arm by the vane on alternate actuations of the arm, said mechanism comprising a rotary cam, a pawl and ratchet for turning the cam, and a lever operated by the cam; substantially as described.

4. In a machine having a work head with a chuck for clamping a work-piece, a chute for receiving work-pieces and having a slot, a work carrier movable through the slot in the chute to enter a work-piece and having a flange to force the work-piece from the chute, and a spring pressed gate yieldably resisting the passage of the work-piece in one direction and positively opposing its return to the chute in the other direction; substantially as described.

5. In a machine having a work head with a chuck for clamping a work-piece, a chute for receiving work-pieces and having a slot, a work carrier movable through the slot in the chute to enter a work-piece, a device for locating a work-piece in the chute in alignment with the work carrier, means for successively feeding work pieces to the locating device, and means for moving the carrier to transfer the work-pieces from the chute to the chuck; substantially as described.

6. In a machine having a work head with a chuck for clamping a work-piece, a chute for receiving work-pieces and having a slot, a work carrier movable through the slot in the chute to enter a work-piece, a plate having yieldable arms for supporting a work-piece in the chute in alignment with the work carrier, means for successively feeding work-pieces onto said arms, and means for moving the carrier to transfer the work-pieces from the chute to the chuck; substantially as described.

7. In a machine having a work head with a chuck for clamping a work-piece, a chute for receiving work-pieces and having a slot, a work carrier movable through the slot in the chute to enter a work-piece, a plate having yieldable arms for supporting a work-piece in the chute, means for adjusting said yieldable arms to locate the work-piece in alignment with the work carrier, means for successively feeding work-pieces onto said arms, and means for moving the carrier to transfer the work-pieces from the chute to the chuck; substantially as described.

8. In a machine having a work head with a chuck for clamping a work-piece, an inclined chute having a downward bend at the lower end, escapement mechanism mounted on said bent down portion for successively feeding work-pieces to the end of the chute, a work carrier movable through a slot in the chute to enter a work-piece at the end of the chute, means at the end of the chute to locate a work-piece in alignment with the work carrier, and means for moving the carrier to transfer the work-piece from the chute to the chuck; substantially as described.

9. In a machine having a work head with a chuck for clamping a work-piece, an inclined chute for receiving work-pieces and having a slot, a work carrier movable through the slot in the chute to enter a work-piece, a swinging arm for moving the carrier, mechanism on the chute for successively feeding work-pieces into alignment with the carrier and comprising a rock shaft, and a trip arm secured to the rock shaft and engaged and operated by the swinging arm; substantially as described.

10. In a chuck loading mechanism, a loading arm, means for swinging the arm, a rotatable cam having high and low spots, means for turning the cam, and a lever actuated by the cam for decreasing the swinging movement of the arm on alternate actuations; substantially as described.

11. In a chuck loading mechanism, a loading arm, means for swinging the arm, a rotatable cam having high and low spots in alternation, and means operated by the swinging arm for turning the cam to decrease the swinging movement of the arm on alternate swingings; substantially as described.

12. In a chuck loading mechanism, a loading arm, means for swinging the arm, a pawl carried by the arm, a rotatable ratchet wheel, a cam on the wheel, a lever having a roller engagable with the cam, a latch carried by the lever for locking the wheel in advanced position, and an abutment on the lever for limiting movement of the arm; substantially as described.

13. In a chuck loading mechanism, a loading arm having a plug to enter a hollow work-piece, a flange on the plug for forcing the work-piece towards the chuck, and springs for holding the work-piece on the plug to facilitate removal of the work-piece from the chuck; substantially as described.

14. In a chuck loading mechanism, a chuck, a chute for a series of work-pieces, a work carrier having a work centering part with a series of slots, springs in the slots and yieldably holding a work-piece on the carrier, means for reciprocating the carrier between the outlet end of the chute and the chuck, and the carrier having an abutment engaging one end of the work-piece for forcing the work-piece axially towards the chuck and holding the piece during a work-gripping action of the chuck; substantially as described.

15. In a chuck loading and unloading mechanism, a chuck, a work carrier having a work centering part, springs for yieldingly holding a work-piece on the carrier, a chute for a series of work-pieces, means for reciprocating the carrier between the outlet end of the chute and the chuck, a spring pressed gate interposed in the path of a work-piece on the carrier and yieldable in one direction, the carrier having an abutment engaging one end of the work-piece for forcing the work-piece through the gate towards the chuck, and the gate being unyieldable in the opposite direction to remove a work-piece from the carrier; substantially as described.

16. In a machine having a work head with a chuck for clamping a work-piece, a chute for receiving work-pieces and having an outlet, a work carrier, means for reciprocating the carrier between the outlet and the chuck, the carrier having an abutment to engage the end of a work-piece and remove it from the chute, and a spring pressed gate yieldable in the direction of movement of the work-piece to the chuck and unyieldable in the direction of return to the chute; substantially as described.

17. In a chuck loading mechanism, a chuck, a chute for a series of work-pieces and having an outlet, a work carrier and a movable support therefor, means for reciprocating the support to move the work carrier to and fro between the chuck and the outlet, escapement mechanism for controlling the arrest and the advance of work-pieces along the chute to the outlet, and an escapement actuating arm carried by the chute in the path of the movable support for operation thereby; substantially as described.

18. In a chuck loading mechanism, a chuck, a chute for a series of work-pieces and having an outlet, a work carrier and a movable support therefor, means for reciprocating the support to move the work carrier to and fro between the chuck and the outlet, escapement mechanism for controlling the arrest and the advance of work-pieces along the chute to the outlet, an escapement actuating member in the path of the movable support for operation thereby, and means for limiting the stroke of the carrier on alternate reciprocations to prevent operation of the escapement mechanism; substantially as described.

19. In a chuck loading mechanism, a chuck, a chute for a series of work-pieces and having an outlet, a work carrier, means for reciprocating the work carrier to and fro between the chuck and the outlet, escapement mechanism for controlling the advance of work-pieces along the chute to the outlet, means for causing the stroke of the carrier to be amplified on alternate reciprocations to effect operation of the escapement mechanism, and means for causing the removal of a work-piece from the chuck and carrier on one of said amplified strokes; substantially as described.

20. In a chuck loading mechanism, a chuck, a chute for a series of work-pieces and having an outlet, a support having a work carrier movable to and fro between the outlet and the chuck, escapement mechanism for controlling the advance of work-pieces along the chute successively into the path of the work carrier, an escapement actuating member mounted on the chute in the path of the support for actuation thereby, and fluid pressure means for reciprocating the support; substantially as described.

21. In a machine having a work head with a chuck, a chute for a series of work-pieces and having an outlet, a swinging arm having a work carrier movable to and fro between the outlet and the chuck, escapement mechanism for controlling the advance of work-pieces along the chute successively into the path of the work carrier, a cylinder of sector form mounted adjacent to the work head, and a vane in the cylinder for swinging the arm; substantially as described.

In testimony whereof I hereunto affix my signature.

CLARENCE C. STEVENS.